United States Patent
Hoffjann et al.

(10) Patent No.: US 7,731,127 B2
(45) Date of Patent: Jun. 8, 2010

(54) DRAIN MAST CONNECTOR

(75) Inventors: Claus Hoffjann, Hamburg (DE); Holger Czopka, Hamburg (DE); Harald Gruendel, Hamburg (DE)

(73) Assignee: Airbus Deutschland GmbH, Hamburg (DE)

( * ) Notice: Subject to any disclaimer, the term of this patent is extended or adjusted under 35 U.S.C. 154(b) by 216 days.

(21) Appl. No.: 11/383,990

(22) Filed: May 18, 2006

(65) Prior Publication Data

US 2006/0273224 A1 Dec. 7, 2006

Related U.S. Application Data

(60) Provisional application No. 60/682,282, filed on May 18, 2005.

(30) Foreign Application Priority Data

May 18, 2005 (DE) .................. 10 2005 022 855

(51) Int. Cl.
*B64D 1/00* (2006.01)
(52) U.S. Cl. .................................... 244/136
(58) Field of Classification Search ................ 244/136, 244/134 D, 137.4, 1 A, 129.1, 131
See application file for complete search history.

(56) References Cited

U.S. PATENT DOCUMENTS

| 5,552,576 A * | 9/1996 | Giamati ..................... 219/201 |
| 7,097,131 B2 * | 8/2006 | Palmer et al. ............... 244/1 A |
| 2005/0230547 A1 * | 10/2005 | Giamati et al. ........... 244/129.1 |

FOREIGN PATENT DOCUMENTS

| DE | 10142696 A1 | 3/2003 |
| DE | 10301374 A1 | 8/2004 |
| DE | 102005003436 A1 | 8/2005 |

* cited by examiner

*Primary Examiner*—Michael R Mansen
*Assistant Examiner*—Michael Kreiner
(74) *Attorney, Agent, or Firm*—Christopher Paradies; Fowler White Boggs, P.A.

(57) ABSTRACT

A drain-mast connector, for use in transportation vehicles such as aircraft, includes an interface pipe which extends through an outer skin of a fuselage of an aircraft via a nipple-like connector. Such a connector allows for simple plug connection of the drain mast pipe and allows less contamination of the fuselage due to grey water disposal. Such a plug-like connection does not require a complicated mounting process.

11 Claims, 2 Drawing Sheets

DRAIN MAST CONNECTOR

REFERENCE TO RELATED APPLICATIONS

This application claims the benefit of the filing date of German Patent Application No. 10 2005 022 855.0 filed May 18, 2005 and of U.S. Provisional Patent Application No. 60/682,282 filed May 18, 2005, the disclosure of which applications is hereby incorporated herein by reference.

FIELD OF THE INVENTION

The field relates generally to grey water disposal in aircraft. The field also relates to a drain-mast connector for an aircraft.

TECHNOLOGICAL BACKGROUND

In civil aviation, outlet ports for aircraft sewage are designated as a drain-mast. The drain-mast is located beneath the aircraft fuselage and releases so-called greywater into the atmosphere, which generally comprises the condensate of the cargo spaces and the outer doors, as well as the washwater of all of the hand wash basins and accordingly, has contaminants (such as soap, for example) as well as colored contaminants, such as kitchen waste, like coffee, tea, or juices. The underside of the aircraft fuselage therefore may be soiled with the removal of the greywater into the atmosphere by these contaminants, whereby the function of flaps, valves and the like may be impaired. Because of these contaminants, the underside of the fuselage should either be cleaned or at least be monitored for possible contaminants.

DE 103 01 374, for example, discloses connecting the discharge port of the drain-mast via a bellows to the aircraft-internal grey water system. This connection, however, is complicated, since the mounting of the drain-mast must be done blind, that is, without an unobstructed view on the individual components, since the bellows is concealed in a recess behind the outer skin of the fuselage. In the worst case, therefore, the bellows may bend or snap off during mounting of the drain-mast, which can lead to a sealing of the connection, without this error being noticed immediately. As a result, a complete stoppage of the greywater system during the flight could occur. As a result of the badly accessible and deformable motor bellows design, therefore, a quick and simple exchange of a damaged drain-mast (for example as a result of stoppage, defective heating elements, mechanical damage) frequently is not possible. The design of the drain-mast described in DE 103 01 374 may be disadvantageous, because a separate ground wire must be installed for lightning protection, and a pressure range limit between the housing of the drain-mast and the cabin area in which the air leakage rate of the aircraft and also the energy consumption of the climate control unit increases, is not permitted.

SUMMARY OF THE INVENTION

Among other things, one object of the invention is to provide for removal of grey water in an aircraft, which permits a faster and easier changing of a damaged drain-mast, without the risk that the drain-mast will become blocked.

In one example, a drain-mast connector, which may be utilized in transportation vehicles, may allow for faster and easier changing of such damaged drain mast.

In one example, the drain-mast connector includes an interface pipe, as well as a drain-mast pipe. The interface pipe serves as a connection piece for the drain-mast pipe, which extends outside of the aircraft fuselage. In contrast to the drain mast pipe, the interface pipe extends substantially inside the fuselage of the aircraft, i.e. extending behind the outer skin of the aircraft fuselage, but projects with one end in a nipple-like manner over the underside of the fuselage of the aircraft, in order to make it visibly accessible for the connection of the drain-mast pipe. In this regard, the drain-mast pipe has a first end, which is formed in order to be connected with the nipple-like end of the interface pipe. Since the nipple-like end of the interface pipe projecting over the fuselage underside has only a minimal length, the interface pipe is insensitive to outer effects, and thus, damage of the fuselage is prevented as much as possible.

In order for the interface pipe to be attached to the fuselage of the aircraft, the interface pipe may be equipped on its outer wall with a collar-like connection flange, such that the interface pipe may be attached in a sealed manner via a flange to an opening in the fuselage underside of the aircraft. In one example, the flange of the interface pipe may be screwed through the outer skin of the aircraft fuselage to a flange of the drain-mast housing. An interface plate may be interposed between the flange of the interface pipe and the outer skin of the fuselage.

In one example, in order to allow for a simple mounting of the drain-mast pipe to the interface pipe, for example, by plugging or screwing on, the interface pipe is attached rigidly to the fuselage, such that it cannot deform upon mounting of the drain-mast pipe. Thus, the drain-mast pipe may be plugged simply onto the interface pipe, whereby the drain-mast pipe may have a continuously greater diameter, or also a greater diameter only at its first end, and a greater diameter than the passive counter piece of the interface pipe. In another example, at least one O-ring may be fitted between both overlapping pipe sections, in order to ensure the sealing of the pipe connection.

In one example, in order to allow for pressure-seal fit between the fuselage or the cabin of the aircraft and the housing of the drain-mast, in which the drain-mast pipe is placed, the drain-mast housing may be screwed via a flange connection (mentioned above) to the fuselage. Screws may be screwed from the exterior of the fuselage into nuts riveted to a nut plate mounted to a flange of the interface pipe. In this manner, for example, by using a flat-or edge sealing with sealing paste or a comparable solution, the opening in the fuselage is closed, through which the interface pipe extends. This screw connection of the drain-mast housing with the flange of the interface pipe therefore, simultaneously allows lightning protection for the drain-mast, which has been typically been addressed with a separate ground wire. In order to improve lightning protection further, the underside of the interface plate as well as the surface of the interface pipe flange may also be polished to be metallically shiny in the area of the screwing with the fuselage, and resulting in reduced transfer resistance.

Thus, a quick and simple changing of a damaged drain-mast pipe may be allowed, as the screws, with which the drain-mast housing is screwed to the fuselage or against the flange of the interface pipe, may be unfixed. Accordingly, a damaged drain-mast may be easily removed. In a correspondingly simple manner, a new drain-mast may be inserted on again and screwed onto the fuselage. With a defective drain-mast, then only one person can quickly and easily exchange the drain-mast, and repair and maintenance costs may hence be reduced.

As described in the previous examples, the interface pipe and the drain-mast pipe may be connected to one another with little deformation as a result of the rigid mounting of the interface pipe to the fuselage of the aircraft. By means of this deformation-free connection of both pipes, the drain-mast pipe may be connected easily with the interface pipe, without requiring to hold the interface pipe against undesired movements, which is the case with the known solution of a bellows. On the other hand, by the deformation-free connection of both pipes, the drain-mast pipe may be removed again simply. By contrast, the motor bellows solution, having pulling loads may give way and with an overload and tear.

In another example, the interface pipe and the drain-mast pipe may be connected sealingly with one another via a sleeve joint. An O-ring sealing may be fitted between the overlapping pipe sections in order to allow for a sealing connection.

So that the fuselage underside is not soiled by the discharged greywater, the drain-mast pipe may have a curved shape as well as a second end, which is directed as an outlet of the drain-mast pipe to the rear of the aircraft. The grey water may be discharged therefore in the direction of the flow of the air, whereby contamination of the fuselage underside may be reduced. These types of contaminants may be reduced further. In one example, the drain-mast pipe has a design, in which the discharge of the drain-mast pipe is spaced more than approximately 20 cm from the fuselage underside of the aircraft. Additionally, turbulence or swirling of the discharged grey water may be reduced. In one example of reducing turbulence, the entire drain-mast pipe is surrounded by an aerodynamically shaped housing, which may be screwed through the connection flange of the interface pipe against the underside of the fuselage of the aircraft in order to allow for a seal.

In order to prevent icing of both liquid-conducting pipes at greater flying altitudes, the interface pipe and/or the drain-mast pipe may be quipped with a heating device (for example, heating wires or coils, PCT- or film heating elements), which may be controlled via one or two separate heating circuits. Likewise, the area of the outlet at the second end of the drain-mast pipe, may be heated and provided with a heat-conducting metal bushing, which in one example, is made of copper in order to prevent icing.

In one example, the rinsing pattern of the discharged greywater may be optimized by having the outlet of the drain-mast pipe include an outer diameter of a maximum of 24 mm, in order to further decrease fuselage soiling. Additionally, turbulence may be minimized with such dimension but good results are also achieved in the range somewhat above 24 mm. For example, with tailwinds, such that ice formation in the drain-mast pipe does not occur, the heated copper bushing may be at least approximately 10 mm long.

The drain-mast connector, in one example, includes an interface pipe extending substantially inside the fuselage of the aircraft and which projects with a nipple-like end over the underside of the fuselage of the aircraft and is rigidly connected to the aircraft fuselage. By means of this rigid and visible attachment to the aircraft fuselage, the drain-mast connector is easily accessible from the outside, in order to allow for mounting of a suitable drain-mast pipe thereon without further complications.

The rigid connection of the drain-mast connector to the aircraft fuselage may be achieved, such that the interface pipe is equipped on its outer wall with a collar-like connection flange. For example, the interface pipe may be attached via a flange connection to be sealed against air leakage at an opening in the underside of the aircraft fuselage. By means of this type of flange connection, simultaneously, the pressurized capability between the cabin and the outer atmosphere may be ensured, since the connection flange is screwed with the fuselage, and allows for a flat sealing. In addition, embodiments of the drain-mast pipe are described, whereby these embodiments likewise apply to the drain-mast connection, the drain-mast connector, as well as to the aircraft. In one example, the drain-mast pipe has a first end, which is connected with the end of the previously described interface pipe. In this connection, the drain-mast pipe may have a bushing on its first end. For example, the drain-mast pipe may be inserted onto the end of the interface pipe.

In order to minimize contamination by discharged greywater on the underside of the aircraft fuselage, the drain-mast pipe may have a curved shape and second end, which is directed to the rear of the aircraft such as an outlet of the drain-mast pipe. In order to further minimize contaminants, the outlet, in one example, is spaced more than 20 cm from the underside of the aircraft fuselage.

DESCRIPTION OF THE DRAWINGS

The drawings illustrate one example of the invention. The same or similar elements are designated with the same reference material.

FIG. 1a shows a lateral sectional view of a drain-mast connection.

FIG. 1b shows a rear view of the drain-mast outlet of FIG. 1a.

DETAILED DESCRIPTION OF AN EMBODIMENT

Figure 1:
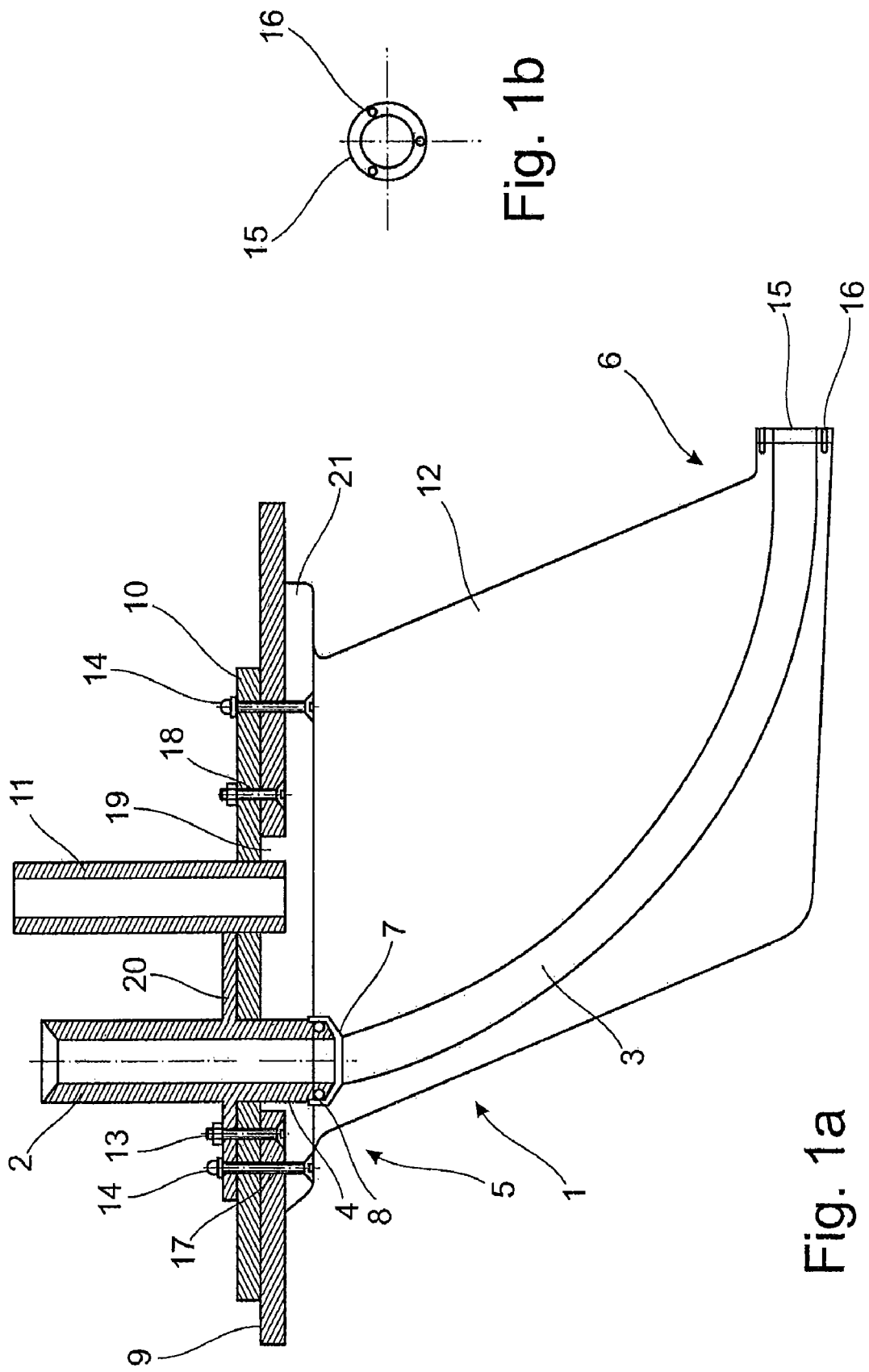

As shown in FIG. 1, a drain-mast connector comprises an interface pipe 2 and a drain-mast pipe 3. The interface pipe 2 is a straight pipe piece and in one example, has a connecting flange 20, which extends radially from the pipe 2, approximately in the area of its front third on its outer wall with a connecting flange 20, which extends radially from the pipe 2. The connecting flange 20 is provided with a plurality of bores, in order to attach the interface pipe 2 to the aircraft fuselage 9 via a connection structure such as screw connection 13, 18, for example.

The drain-mast pipe 3 has a curved shape and has a first end 5 as well as a second end 6. The first end 5 is formed to be connected with the end of the interface pipe 2. In the example shown here, the first end 5 of the drain-mast pipe 3 widens in the manner of a bushing 7, in order to enable insertion onto the nipple-like connector 4 at the end of the interface pipe 2. For sealing of this sleeve connection, a sealing connection structure is used. For example, an O-ring 8 (FIGS. 1 and 2) is fitted onto the end of the nipple-like connector 4 of the interface pipe 2, whereby this O-ring 8 of course also may be fitted in the bushing 7 at the first end 5 of the drain-mast pipe. At the opposite end of the interface pipe 2 a tapered opening 102 may be provided.

Figure 2:
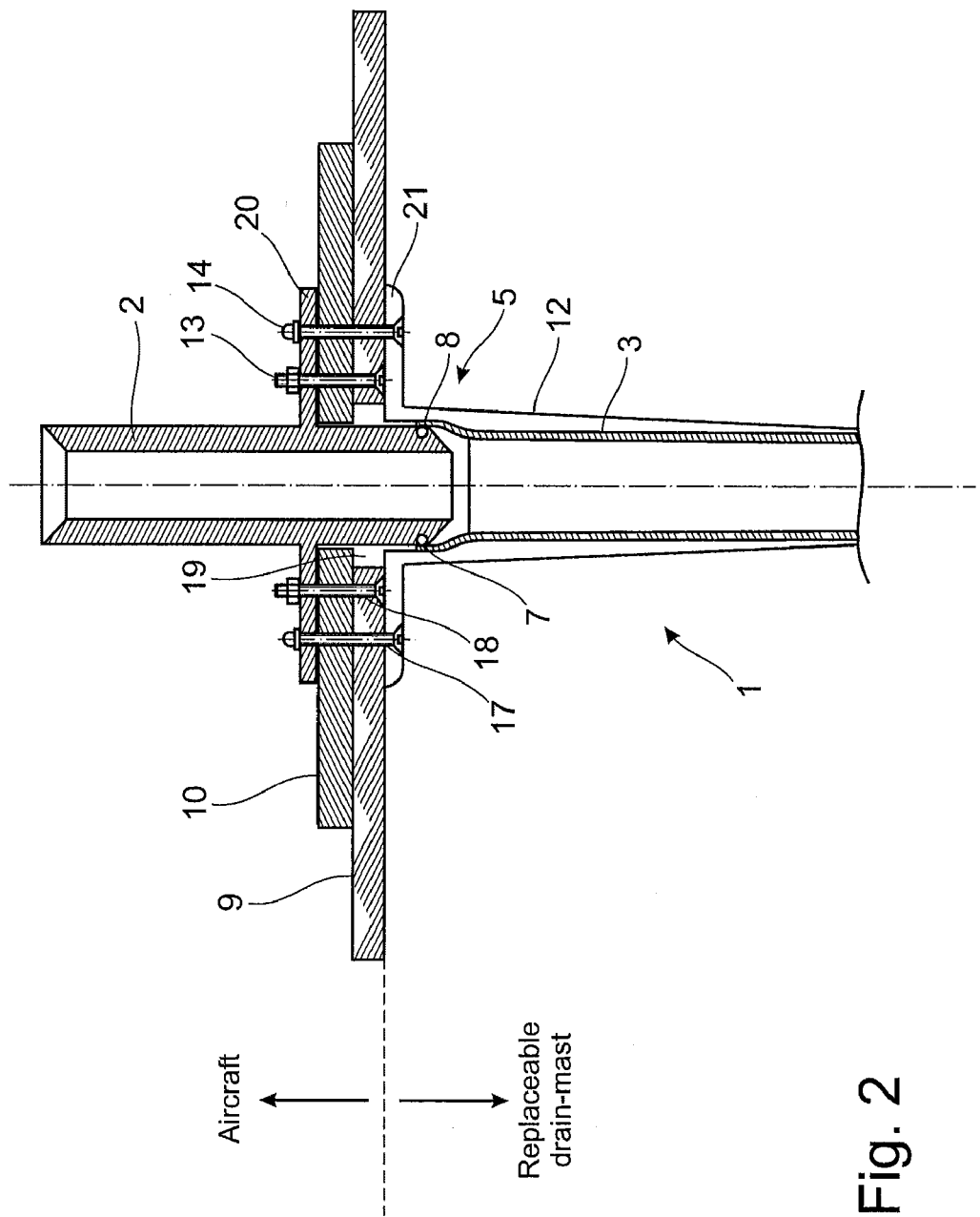
FIG. 2 shows a front sectional view of the drain-mast connection of FIG. 1.

As depicted in FIG. 2, the drain-mast pipe 3 is fitted in a drain-mast housing 12, which has an aerodynamic shape, in order not to negatively affect the spraying pattern caused by undesired turbulence at the outlet of the drain-mast pipe 3.

For installing the drain-mast connector in the aircraft fuselage 9, the fuselage has an opening 19, through which the interface pipe 2 extends. For installing the interface pipe 2, first on the inner side of the outer skin 9 of the aircraft fuselage, an interface or mounting plate 10 is arranged, which has an opening (not depicted) (FIG. 2), through which the interface pipe 2 may extend, such that the nipple-like connector 4 projects slightly over the underside of the fuselage 9 of the aircraft. The components 10 (interface plate) and 2 (interface pipe with connecting flange 20) positioned in this manner on the opening 19 may then be screwed in a sealed manner with the pressure-tight screw connection 13, 18 in the form of a flange connection, such that the interface pipe 2 is connected rigidly with the aircraft fuselage 9.

In one example, for mounting of the drain-mast 1, which includes a drain-mast pipe 3 and a drain-mast housing 12, to an interface pipe 2, an assembly person merely guides the drain-mast 1 from below onto the fuselage underside 9, such that the bushing 7 (FIG. 2) is inserted onto the nipple-like connector 4. As soon as this sealed sleeve connection is formed, the drain-mast housing 12 may be screwed to the underside 9 of the aircraft fuselage. For this purpose, suitable nuts 14 are riveted on the connecting flange 20 or onto the interface plate 10, such that the drain-mast housing 12 may be braced in a sealed manner against the fuselage 9 underside, while countersunk screws 17 are inserted through corresponding bores in the connecting flange 21, in the aircraft fuselage 9, the interface plate 10, and in the connecting flange 20, in order to be screwed into the nut plates 14. When these countersunk screws 17 are fixedly tightened, the described flange connection is tensioned in a sealed manner, such that a surface seal is provided between the outer atmosphere and the fuselage inner space. Other connecting structures besides screws may be used. With the screwing of the drain-mast housing 12 via the screw connection 17, 14, lightning protection for the drain-mast is additionally ensured. In order to further optimize lightning protection safety, the underside of the interface plate 10 as well as the surface of the interface pipe flange 20 may be polished to be shiny metallically in the area of the screwing 18, which results in a minimal transition resistance.

Further from FIG. 1, a port 11 projects through the interface plate 10, which is formed to guide supply lines, such as electrical connections, into the inner chamber of the drain-mast housing 12. These connecting lines are necessary for supplying energy to the heating devices (not shown) for the drain-mast pipe 3 as well as the nipple-like connector 4. The heating devices may be heating wires or coils, for example, which coil winding about the respective pipe sections in order to prevent freezing of the grey water transported by the pipes at high altitudes. Particularly susceptible to ice formation is the outlet in the region of the second end 6 of the drain-mast pipe 3, where the coilings of the heating device are placed densely. In one example, in order to prevent ice formation effectively, a copper bushing 15 is screwed to the outlet of the drain-mast pipe 3, which also prevents ice formation on its outer circumference as the pipe has good heat conducting properties. In this example, the copper bushing 15 has a maximum outer diameter of 24 mm, in order to allow for a minimum turbulence or swirling of the discharged grey water, and for reducing fuselage soiling. In the longitudinal direction, the drain-mast bushing has a length of at least 10 mm, which can prevent ice formation in the drain-mast in tailwinds.

In the event that a drain-mast pipe 3 is damaged, a simple exchange of the drain-mast 1 is allowed as a result of its design. In one example, the countersunk screws 17 only must be released and an electrical plug connection to the heating elements disconnected. Immediately, then, the drain-mast 1 may be removed, while an assembly person pulls the drain mast 1 downwardly. For mounting of a new drain-mast 1, the assembly person need only establish the electrical connection again to the heating elements by plugging a plug onto a bushing on the mounting plate-underside, slide the bushing 5 of a new drain-mast 1 onto the nipple-like connector 4, and then screw the drain-mast housing 12 again with countersunk screws 17 into the nut plates 14. Other connection structures besides screws may be utilized.

Alternative combinations and variations of the examples provided will become apparent based on this disclosure. It is not possible to provide specific examples for all of the many possible combinations and variations of the embodiments described, but such combinations and variations may be claims that eventually issue.

REFERENCE LIST 1 drain mast
2 interface pipe
3 drain mast pipe (heated)
4 nipple-like connector
5 first end of the drain mast pipe
6 second end of the drain mast pipe
7 bushing
8 O-ring
9 aircraft fuselage
10 mounting plate
11 connector for electrical port
12 drain mast housing
13 nut with screw and washer
 (for lightning protection)(pressure-tight)
14 pressurized floating nut plate
15 copper bushing
16 screw
17 countersunk screw
18 screw (for lightning protection)
19 opening
20 connection flange (interface-pipe)
21 connection flange (housing)

What is claimed is:

1. A drain-mast connection for an aircraft having a fuselage with an exterior surface and an opening in the fuselage, the connection comprising:
  an interface pipe including an integrally formed straight pipe piece substantially extending inside the fuselage of the aircraft, the straight pipe piece having a front third portion having an integrally formed nipple-like end portion extending from the straight pipe piece through the fuselage of the aircraft, the nipple-like end portion of the front third portion projecting beyond the exterior surface of the fuselage through the opening in the fuselage, and having on a second end of the interface pipe, opposite the first end of the interface pipe, a tapered opening, such that the interface pipe is a single piece fluidically coupling the tapered opening of the second end, projecting into the fuselage of the aircraft, to an outlet of the nipple-like end portion, projecting out of the fuselage;
  a drain-mast pipe having a first end, the first end having an inner diameter wider than an inner diameter of the drain mast pipe adjacent to the first end such that the first end of the drain-mast pipe is positioned over the nipple-like end portion of the interface pipe, forming a coupling with the nipple-like end portion of the interface pipe, when the nipple-like end portion is inserted into the first end of the drain-mast pipe; and
  the interface pipe includes a connection flange directly connected with an outer wall of the front third portion of the straight pipe piece and extending from the outer wall of the front third portion, such that the interface pipe is a single piece mechanically coupling the interface pipe to a mounting plate via the flange of the interface pipe such that the interface pipe is sealably coupled at the opening in the fuselage of the aircraft using the connection flange.

2. The drain-mast connection of claim 1, wherein the interface pipe and the drain-mast pipe are connected to one another via a sleeve joint.

3. The drain-mast connection of claim 1, wherein the drain-mast pipe has a curved shape and a second end, such that the second end is directed toward the rear of the aircraft as an outlet of the drain-mast pipe.

4. The drain-mast connection of claim 1, wherein the drain-mast pipe is surrounded by a drain-mast housing sealingly attached via a flange connection against the exterior surface of the fuselage of the aircraft.

5. The drain-mast connection of claim 1, wherein the interface pipe and the drain-mast pipe are equipped with a heating device.

6. The drain-mast connection of claim 5, wherein the second end of the drain-mast pipe is provided with a heat-conducting metal bushing.

7. The drain-mast connection of claim 6, wherein the metal bushing is made of copper.

8. An aircraft comprising the drain-mast connection of claim 1.

9. A drain-mast connector for an aircraft, the aircraft having a fuselage with an opening, the connector comprising:
    an interface pipe including an integrally formed straight pipe piece substantially extending inside the fuselage of the aircraft, the straight pipe piece having a front third portion having an integrally formed nipple-like end extending from the straight pipe piece outside of the fuselage through the opening in the fuselage of the aircraft when mounted to the aircraft fuselage, and having on a second end of the interface pipe, opposite the first end of the interface pipe, a tapered opening, such that the interface pipe is a single piece fluidically coupling the tapered opening of the second end, projecting into the fuselage of the aircraft when mounted to the aircraft fuselage, to an outlet of the nipple-like end portion, projecting out of the fuselage when mounted to the aircraft fuselage, and
    the interface pipe includes a connection flange directly connected with an outer wall of the front third portion of the straight pipe piece of the interface pipe and extending from the outer wall of the front third portion such that the interface pipe is a single piece mechanically coupling the interface pipe to a mounting plate via the flange of the interface pipe such that the interface pipe is sealably mounted to the fuselage at the opening of the fuselage using the connection flange, wherein the nipple-like end extends through the opening and outside of the fuselage of the aircraft, when the interface pipe is mounted to the aircraft fuselage.

10. The drain-mast connector of claim 9, wherein the connection flange is sealed against air leakage between the fuselage and the connection flange.

11. The drain mast connector of claim 10, including a mounting plate, wherein the connection flange is mounted on the mounting plate using a threaded fastener to couple the connection flange and the mounting plate to the fuselage.

* * * * *